US012055631B2

(12) United States Patent
Moebius et al.

(10) Patent No.: US 12,055,631 B2
(45) Date of Patent: *Aug. 6, 2024

(54) ADAPTIVE LIDAR SCANNING TECHNIQUES FOR IMPROVED FRAME RATE AND SAFETY

(71) Applicant: The Charles Stark Draper Laboratory, Inc., Cambridge, MA (US)

(72) Inventors: Michael G. Moebius, Somerville, MA (US); Steven J. Spector, Lexington, MA (US); Steven J. Byrnes, Watertown, MA (US); Christopher Bessette, Melrose, MA (US); Scott Evan Lennox, Arlington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 1101 days.

This patent is subject to a terminal disclaimer.

(21) Appl. No.: 16/664,411

(22) Filed: Oct. 25, 2019

(65) Prior Publication Data
US 2020/0132849 A1 Apr. 30, 2020

Related U.S. Application Data

(60) Provisional application No. 62/751,500, filed on Oct. 26, 2018, provisional application No. 62/751,497, filed on Oct. 26, 2018.

(51) Int. Cl.
*G01S 17/89* (2020.01)
*G01S 7/499* (2006.01)
(Continued)

(52) U.S. Cl.
CPC .............. *G01S 17/89* (2013.01); *G01S 7/499* (2013.01); *G01S 13/865* (2013.01);
(Continued)

(58) Field of Classification Search
CPC ......... G01S 17/89; G01S 17/499; G01S 17/93
See application file for complete search history.

(56) References Cited

U.S. PATENT DOCUMENTS

| 4,013,000 A | 3/1977 | Kogelnik |
| 5,059,008 A | 10/1991 | Flood et al. |

(Continued)

FOREIGN PATENT DOCUMENTS

| WO | WO 96/08932 A1 | 3/1996 |
| WO | WO 03/098263 A2 | 11/2003 |
| WO | WO 2008/045126 A2 | 4/2008 |

OTHER PUBLICATIONS

U.S. Appl. No. 16/663,814, filed Oct. 25, 2019, Moebius, et al.
(Continued)

*Primary Examiner* — Charles J Han

(57) ABSTRACT

A LiDAR system includes an array of optical emitters, an objective lens optically coupling each optical emitter to a respective unique portion of a field of view, an optical switching network coupled between a laser and the array of optical emitters and a controller coupled to the optical switching network and configured to cause the optical switching network to route light from the laser to a sequence of the optical emitters according to a dynamically varying temporal pattern and to vary the temporal pattern based at least in part on distance to an object within the field of view. The LiDAR system scans different portions of the field of view differently, such as with different laser power levels, different revisit rates and/or different scan patterns, for example based on likelihood of detecting objects of interest in the various portions or based on likely relative importance of objects likely to be found in the various portions.

5 Claims, 14 Drawing Sheets

(51) Int. Cl.
*G01S 13/86* (2006.01)
*G01S 17/26* (2020.01)
*G01S 17/93* (2020.01)
*H01S 3/13* (2006.01)

(52) U.S. Cl.
CPC ............ *G01S 13/867* (2013.01); *G01S 17/26* (2020.01); *G01S 17/93* (2013.01); *H01S 3/1305* (2013.01)

(56) References Cited

U.S. PATENT DOCUMENTS

| | | | |
|---|---|---|---|
| 5,392,157 | A | 2/1995 | Shih |
| 5,943,159 | A | 8/1999 | Zhu |
| 6,628,851 | B1 | 9/2003 | Rumpf et al. |
| 6,830,944 | B1 | 12/2004 | Smits |
| 6,927,886 | B2 | 8/2005 | Plesniak et al. |
| 7,298,555 | B2 | 11/2007 | Capps |
| 7,864,419 | B2 | 1/2011 | Cossairt et al. |
| 10,466,423 | B2 | 11/2019 | Spector et al. |
| 10,473,862 | B2 | 11/2019 | Spector et al. |
| 2002/0048423 | A1 | 4/2002 | Frick et al. |
| 2002/0181836 | A1 | 12/2002 | Lemoff |
| 2003/0198259 | A1 | 10/2003 | Zhang et al. |
| 2004/0033010 | A1 | 2/2004 | McGuire, Jr. |
| 2004/0080807 | A1 | 4/2004 | Chen et al. |
| 2009/0034042 | A1 | 2/2009 | Tholl et al. |
| 2013/0027715 | A1 | 1/2013 | Imaki et al. |
| 2015/0346340 | A1 | 12/2015 | Yaacobi et al. |
| 2016/0327751 | A1 | 11/2016 | Wu et al. |
| 2016/0335778 | A1* | 11/2016 | Smits .............. H04N 23/56 |
| 2017/0003507 | A1 | 1/2017 | Raval et al. |
| 2017/0184450 | A1 | 6/2017 | Doylend et al. |
| 2017/0202528 | A1 | 7/2017 | Roessl et al. |
| 2018/0175961 | A1* | 6/2018 | Spector .............. H04Q 11/0003 |
| 2019/0146087 | A1 | 5/2019 | Mansur et al. |
| 2019/0324128 | A1* | 10/2019 | Dielacher .............. G01S 17/89 |

OTHER PUBLICATIONS

Seok, et al., "Large-scale broadband digital silicon photonic switches with vertical adiabatic couplers", OPTICA, vol. 3, No. 1, pp. 64-70, Jan. 13, 2016.

European Patent Office as the International Searching Authority, Authorized Officer: Marta Costa, International Search Report and Written Opinion of the International Searching Authority, PCT/US2019/058168, Jan. 3, 2020, 14 pages.

International Searching Authority Authorized Officer: Menck, Alexander, Notification of Transmittal of the International Search Report and the Written Opinion of the International Searching Authority; PCT/US2018/036538, Sep. 19, 2018, 15 pages.

Ashtiani, et al., "A Liquid Optical Phase Shifter With an Embedded Electrowetting Actuator," Journal of Microelectromechnical Systems, vol. 26, No. 2, 4 pages, Apr. 2017.

Chun, et al., "Spatial 3-D Infrastructure: Display-Independent Software Framework, High-Speed Rendering Electronics, and Several New Displays," appeared in Stereoscopic Displays and Virtual Reality Systems XII, Proceedings of SPIE-IS&T Electronic Imaging, SPIE Vol. 5664, pp. 302-312, 2005.

Geng, "Three-dimensional display technologies," Advances in Optics and Photonics 5, pp. 456-535, 2013.

Halle, "Holographic stereograms as discrete imaging systems," SPIE Proceeding #2176 "Practical Holography VIII", 12 pages, Feb. 1994.

Holliman, et al., "Three-Dimensional Displays: A Review and Applications Analysis," IEEE Transactions on Broadcasting, vol. 57, No. 2, pp. 362-371, Jun. 2011.

Seok, et al., "Large-scale broadband digital silicon photonic switches with vertical adiabatic couplers: supplementary material," Optica, 5 pages, Jan. 13, 2016.

Smithwick, et al., "Interactive Holographic Stereograms with Accommodation Cues," Practical Holography XXIV: Materials and Applications, SPIE, 14 pages, 2010.

Vivien, et al., "Experimental demonstration of a low-loss optical H-tree distribution using silicon-on-insulator microwaveguides," Applied Physics Letters, vol. 85, No. 5, 3 pages, Aug. 2, 2004.

International Searching Authority, European Patent Office, International Search Report and Written Opinion, International Application No. PCT/US2017/000095, 15 pages, mailed Mar. 27, 2018.

International Searching Authority, European Patent Office, Invitation to Pay Additional Fees, International Application No. PCT/US2017/066885, 13 pages, mailed Mar. 19, 2018.

International Searching Authority, European Patent Office, International Search Report and Written Opinion, International Application No. PCT/US2017/066885, 19 pages, mailed May 14, 2018.

International Searching Authority, European Patent Office, Invitation to Pay Additional Fees and, Where Applicable, Protest Fee, International Application No. PCT/US2018/014668, 16 pages, May 14, 2018.

International Searching Authority, European Patent Office, International Search Report and Written Opinion, International Application No. PCT/US2018/014668, 21 pages, Jul. 5, 2018.

International Searching Authority, European Patent Office, International Search Report and Written Opinion, International Application No. PCT/US2019/058038, 14 pages, mailed Jan. 3, 2020.

\* cited by examiner

ADAPTIVE LIDAR SCANNING TECHNIQUES FOR IMPROVED FRAME RATE AND SAFETY

CROSS REFERENCE TO RELATED APPLICATIONS

This application claims the benefit of U.S. Provisional Patent Application No. 62/751,497, filed Oct. 26, 2018, titled "Beam Scanning Methods for Improved Eye Safety in LiDAR Systems," and U.S. Provisional Patent Application No. 62/751,500, filed Oct. 26, 2018, titled "Adaptive LiDAR Scanning Techniques for Improved Frame Rate And Safety," the entire contents of each of which are hereby incorporated by reference herein, for all purposes. The present application is related to U.S. patent application Ser. No. 16/663,814, titled "Beam Scanning Methods for Improved Eye Safety in LiDAR Systems," the entire contents of which are hereby incorporated by reference herein, for all purposes.

BACKGROUND

Technical Field

The present invention relates to LiDAR (light detection and ranging) systems and, more particularly, to LiDAR systems that dynamically varying their temporal scanning patterns to improve frame rate and accuracy.

Related Art

In general, more laser power and/or longer dwell times are required to acquire reliable, accurate range measurements using LiDAR systems at long ranges than at short ranges. In the simplest case, the amount of signal that returns to a LiDAR system falls off as $1/D^2$, where D is the distance between the LiDAR system and a target. Therefore, conventional LiDAR systems use power levels and dwell times calculated to meet design reliability and accuracy requirements based on maximum distances to objects in fields of view of the systems. However, long dwell times limit revisit frequency and, therefore, how quickly a LiDAR system can detect a new object or a new location of a moved object. Furthermore, power, volume and mass limitations of miniature LiDAR system, such as those used in automotive applications, are often strained by the maximum distance requirements. Smaller, lighter-weight and more power-efficient LiDAR systems are, therefore, desirable.

SUMMARY OF EMBODIMENTS

An embodiment of the present invention provides a LiDAR system. The LiDAR system has a field of view. The LiDAR system includes a laser, an array of optical emitters and an objective lens. The objective lens optically couples each optical emitter of the array of optical emitters to a respective unique portion of the field of view. An optical switching network is coupled between the laser and the array of optical emitters. A controller is coupled to the optical switching network. The controller is configured to cause the optical switching network to route light from the laser to a sequence of optical emitters of the array of optical emitters according to a dynamically varying temporal pattern. The controller is configured to vary the temporal pattern based at least in part on distance to an object within the field of view. An optical receiver is coupled to the optical switching network. The optical receiver is configured to receive light reflected from the field of view.

Optionally, in any embodiment, the controller may be configured to dynamically vary the temporal pattern based at least in part on reflectivity of the object.

Optionally, in any embodiment, the controller may be configured to dynamically vary the temporal pattern so as to dynamically vary a per-pixel dwell time.

Optionally, in any embodiment, the controller may be configured to repeatedly interrogate a pixel that includes the object during a series of interrogations, without interrupting the series of interrogations to interrogate another pixel. For each interrogation of the series of interrogations, the controller may be configured to automatically estimate a respective distance to the object. The controller may be configured to automatically calculate a respective confidence score of the respective distance. When the confidence score exceeds a predetermined value, the controller may be configured to terminate the series of interrogations and advance to interrogate another pixel.

Optionally, in any embodiment, the controller may be configured to scan different portions of the field of view at different rates.

Optionally, in any embodiment, the controller may be configured to dynamically vary the temporal pattern differently for respective different non-overlapping regions of the field of view.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

LiDAR systems according to the embodiments of the present invention employ adaptive scanning techniques to minimize laser power required, maximize frame rate achievable while scanning a scene, and improve safety, i.e., utility and effectiveness of the LiDAR system at detecting and ranging. In this context, "safety" refers to being able to safely operate a vehicle or other system based on information from the LiDAR system, for example remaining on course and avoiding collisions. Unless otherwise indicated, safety does not refer to eye safety, as related to possible eye injury by laser light.

Figure 1:
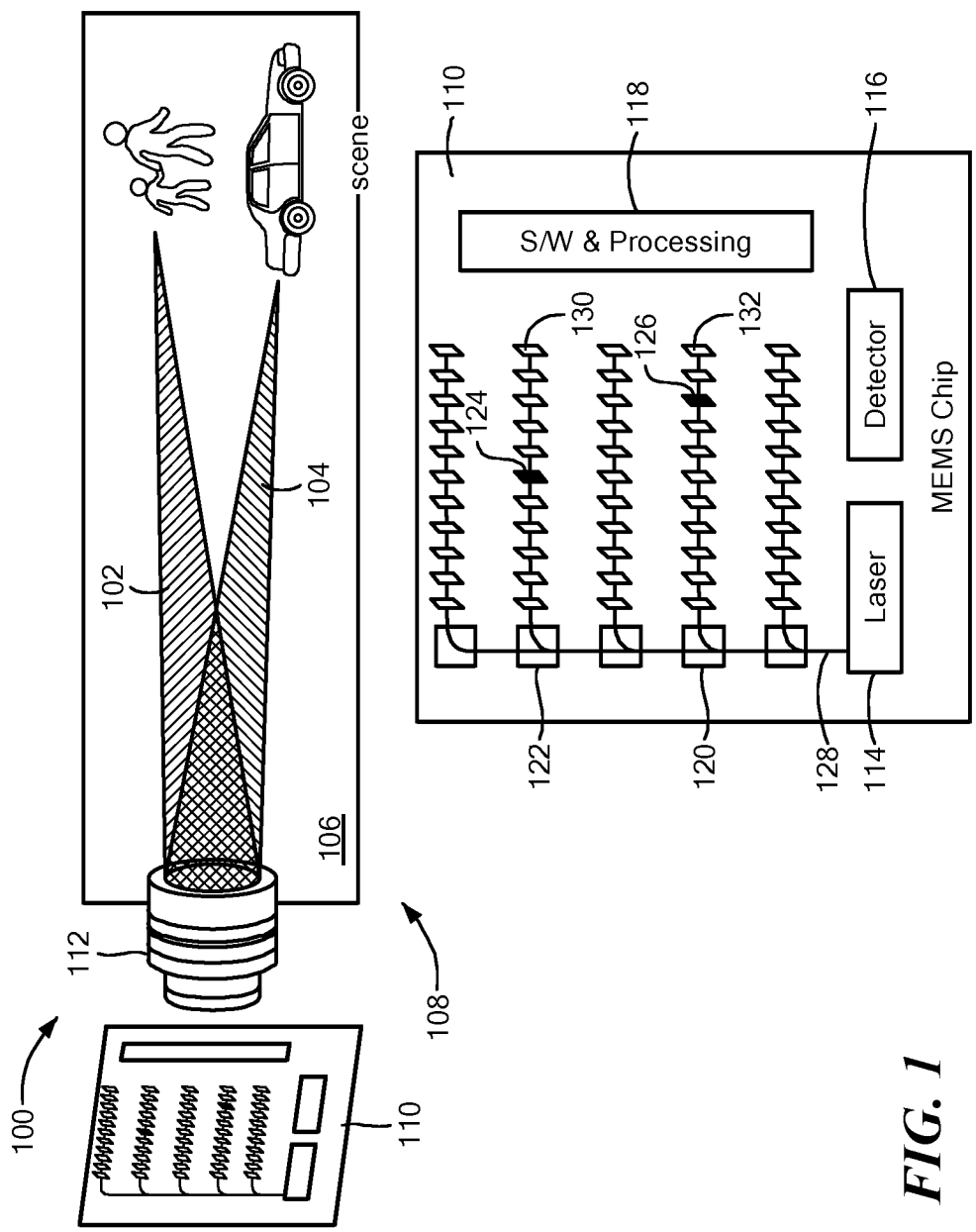
FIG. 1 is an overview diagram of a LiDAR system that includes a photonic integrated circuit (PIC), according to an embodiment of the present invention.

As shown in FIG. 1, a LiDAR system 100, according to embodiments of the present invention, can be configured to emit one or more laser light beams, exemplified by beams 102 and 104, to scan a scene 106 within a field of view of the LiDAR system 100. The LiDAR system 100 includes an optical circuit 108. The optical circuit 108 includes a photonic integrated circuit (PIC) 110, a lens 112, one or more lasers 114, one or more optical detectors 116 and control electronics (a controller) 118.

Light from the laser 114 is coupled into the photonic integrated circuit 110, where a series of two or more optical switches, represented by optical switches 120, 122, 124 and 126, define where on the PIC 110 the light is emitted into free space. In one arrangement, each optical switch 120-122 is a MEMS switch, which may include a MEMS switchable overpass waveguide that couples light from a bus waveguide 128 to a selected waveguide (row), exemplified by rows 130 and 132, of grating switches, exemplified by grating switches 124 and 126.

Figure 2:
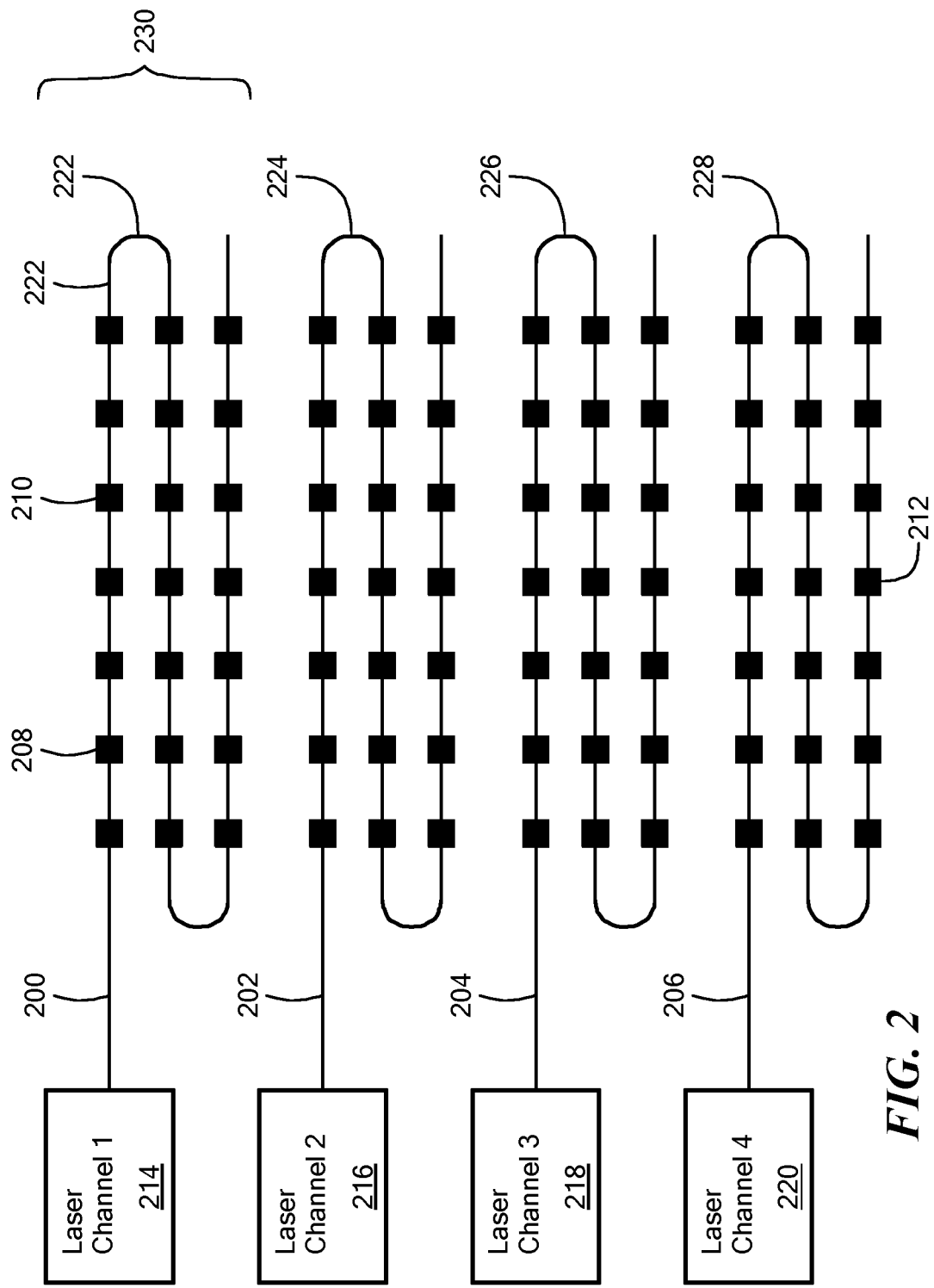
FIG. 2 is a diagram of a serpentine waveguide arrangement for a PIC that may be used in the LiDAR system of FIG. 1, according to another embodiment of the present invention.

Alternatively, as shown schematically in FIG. 2, each row, exemplified by rows 200, 202, 204 and 206, of grating switches, exemplified by grating switches 208, 210 and 212, is optically coupled to its own laser and detector, represented by laser channels 214,216,218 and 220, or by using serpentine waveguides 222, 224, 226 and 228 to feed a multitude of rows, for example rows 230, with multiple grating switches, for example grating switches 208-210, per row. Other alternate switching mechanisms are possible, such as tree switches realized through Mach-Zehnder interferometers. Within each row 200-206, each MEMS switch 208-212 moves a grating in proximity to the waveguide 222-228 to couple light out into free space.

Returning to FIG. 1, the objective lens 112 then directs the light, from the PIC 110, to a specific point or region in the scene 106, based on where on the PIC 110 the light is emitted, i.e. which optical switch 124-126 is ON and therefore couples the light into free space. The point or region can be through of as a pixel of the LiDAR field of view. Reflected light from the scene 106 is collected by the objective lens 112 and coupled back onto the PIC 110. The signal is then coupled from the PIC 110 into the detector 116 and processed by the controller 118. This system 100 is categorized as monostatic, because the same optics, for example the lens 112 and the optical switches 120-126, are used to send the excitation pulse into the scene and collect the return signal.

Embodiments of the present invention provide LiDAR systems that can be configured to emit one or more beams to scan a scene (field of view). An exemplary LiDAR system includes of an optical circuit that includes a photonic integrated circuit, lens, laser(s), detector(s), and control electronics. The optical circuit functions as follows: Light from the laser is coupled into the photonic integrated circuit (PIC), where a series of two MEMS switches defines where on the PIC the light is emitted. The first MEMS switch may include a MEMS switchable overpass waveguide that couples light from a bus waveguide to a row of grating switches; an alternative design can be configured by connecting each row of grating switches to its own laser and detector. In each grating switch, a MEMS device moves a grating in proximity to the waveguide to couple light out into free space. The objective lens then directs the light to a specific point in the scene, based on where on the PIC the light is emitted from. Reflected light from the scene is collected by the objective lens and coupled back onto the PIC. The signal is then coupled from the PIC into the detector. Each grating switch thus forms an optical emitter. Collectively the grating switches from an array of optical emitters. Each optical emitter also receives reflected light. Each optical emitter can be considered to represent one pixel of the field of view of the LiDAR system.

The PIC 110 and other aspects of the optical circuit 108 are described in U.S. Pat. Publ. No. 2018/0175961, published Jun. 21, 2018, titled "Integrated MEMS Switches for Selectively Coupling Light in and out of a Waveguide," and U.S. Pat. No. 10,466,423, issued Nov. 5, 2019, titled "Integrated MEMS Switches for Selectively Coupling Light in and out of a Waveguide," the entire contents of each of which are hereby incorporated by reference herein, for all purposes.

Figure 3:
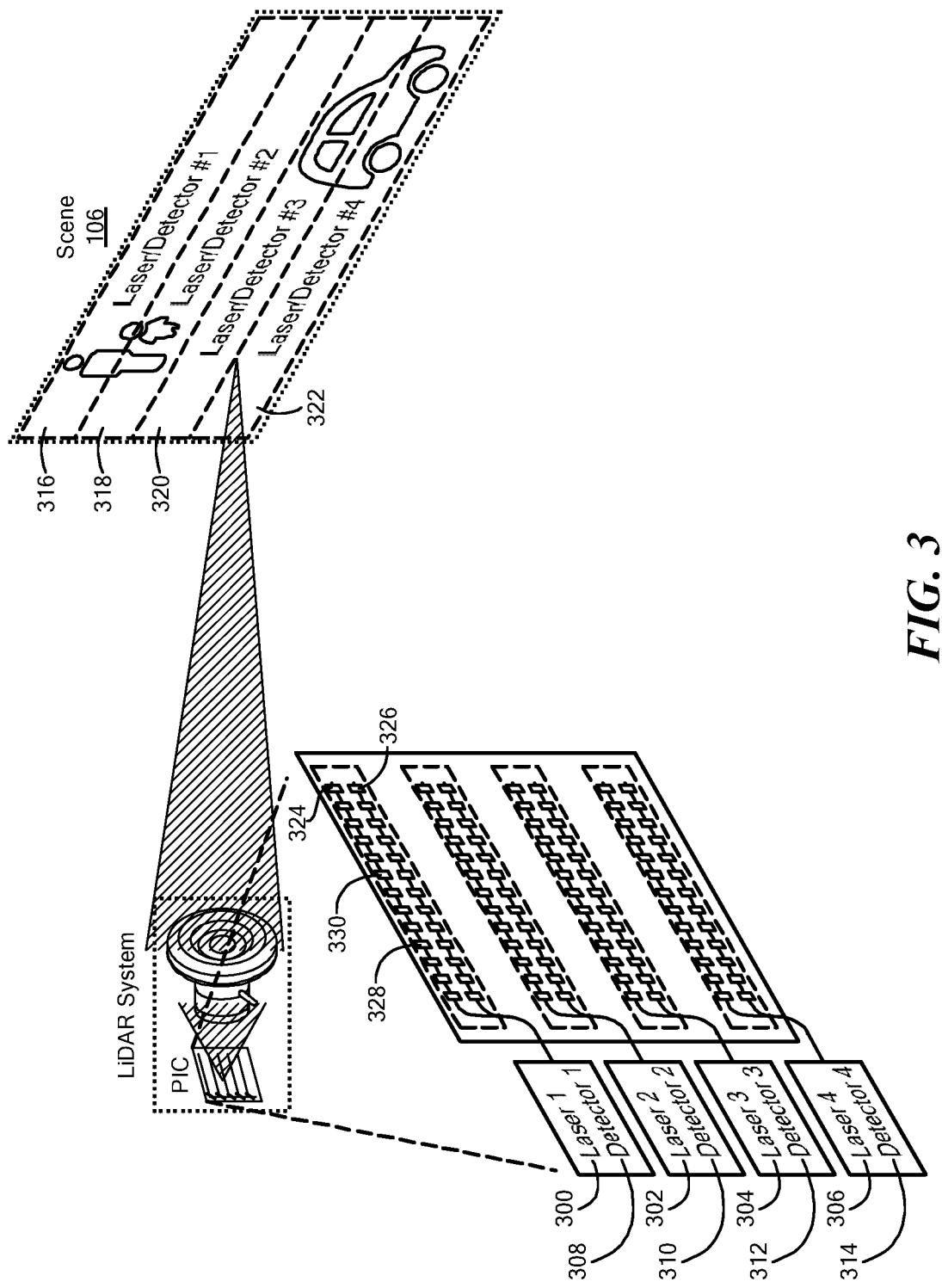
FIG. 3 is a diagram illustrating multiple laser/detector combinations, each addressing separate portions of a LiDAR system field of view (FOV), according to an embodiment of the present invention.

A single laser 114 and detector 116 can be used to address the entire field of view as shown in FIG. 1 or, as shown schematically in FIG. 3, multiple lasers, exemplified by lasers 300, 302, 304 and 306, and multiple detectors, exemplified by detectors 308, 310, 312 and 314, can be used. In this embodiment, each laser 300-306 and detector 308-314 pair addresses a distinct horizontal band, represented by respective bands 316, 318, 320 and 322, within the full field of view. Each laser 300-306 and detector 308-314 has its own set of MEMS switches, which scan the beam across the scene. Using a single laser and detector (FIG. 1) has the advantage of reducing system size, weight, and cost. Using multiple lasers and detectors (FIG. 3) has the advantage of being able to scan a larger number of points (pixels) within the scene 106 per unit of time.

Alternatively, the PIC 110 and objective lens 112 combination can be used together with one or more lasers to scan the beam in the scene, and a separate module (e.g. a separate detector array, not shown) can be configured to collect the return signal. Such as system is categorized as bistatic.

In most cases, a LiDAR system designed to operate at long range is configured to make use of a pulse encoding scheme. This is necessary because at long range, very high pulse energy is required to ensure at least one detected photon returns per pulse. Few lasers are available that can produce these necessary pulse energies, and high pulse energies raise laser eye safety concerns. A work-around is to use a lower pulse energy and send out a high rate pulse train with varying time between pulses, for example random time between pulses or a chirp from some minimum to some maximum pulse frequency. Each spot in the scene is exposed to a number of pulses, and the range is determined by the timing of multiple returns. The ranging success rate, i.e., probability of measuring the correct range to a spot in the scene 106, is determined by the number of detected return photons per pulse and number of pulses sent to each spot.

Figure 4:
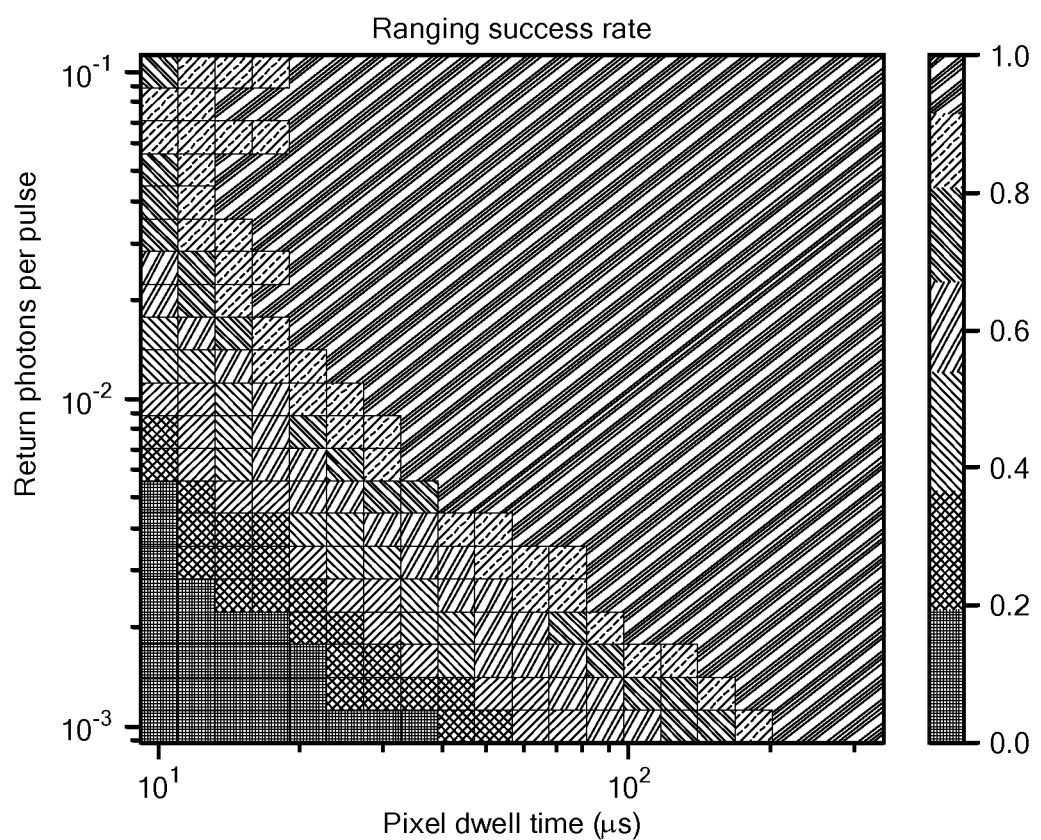
FIG. 4 is a graph illustrating results of a Monte Carlo simulation of ranging success rate for a pulse encoding scheme, according to an embodiment of the present invention.

FIG. 4 is a graph illustrating results of a Monte Carlo simulation of ranging success rate for a pulse encoding scheme. A pulse rate is chirped with an average frequency of 60 MHz. From pixel to pixel, the scan may be in a different vertical place in the graph of FIG. 4. For example, after 5-10 pulses or 20-80 usec, the scan may move on to another pixel.

In general, LiDAR systems do not rely on a single pulse reflection to measure distance to an object. Instead, several pulse reflections from the same direction are used to calculate the distance. Some of the pulse reflections may be discarded, for example if the reflected signal level is below a predetermined value, or if the signal-to-noise ratio of the received signal is below a predetermined value.

How the System Enables Selective Scanning of the Scene

Figure 5A:
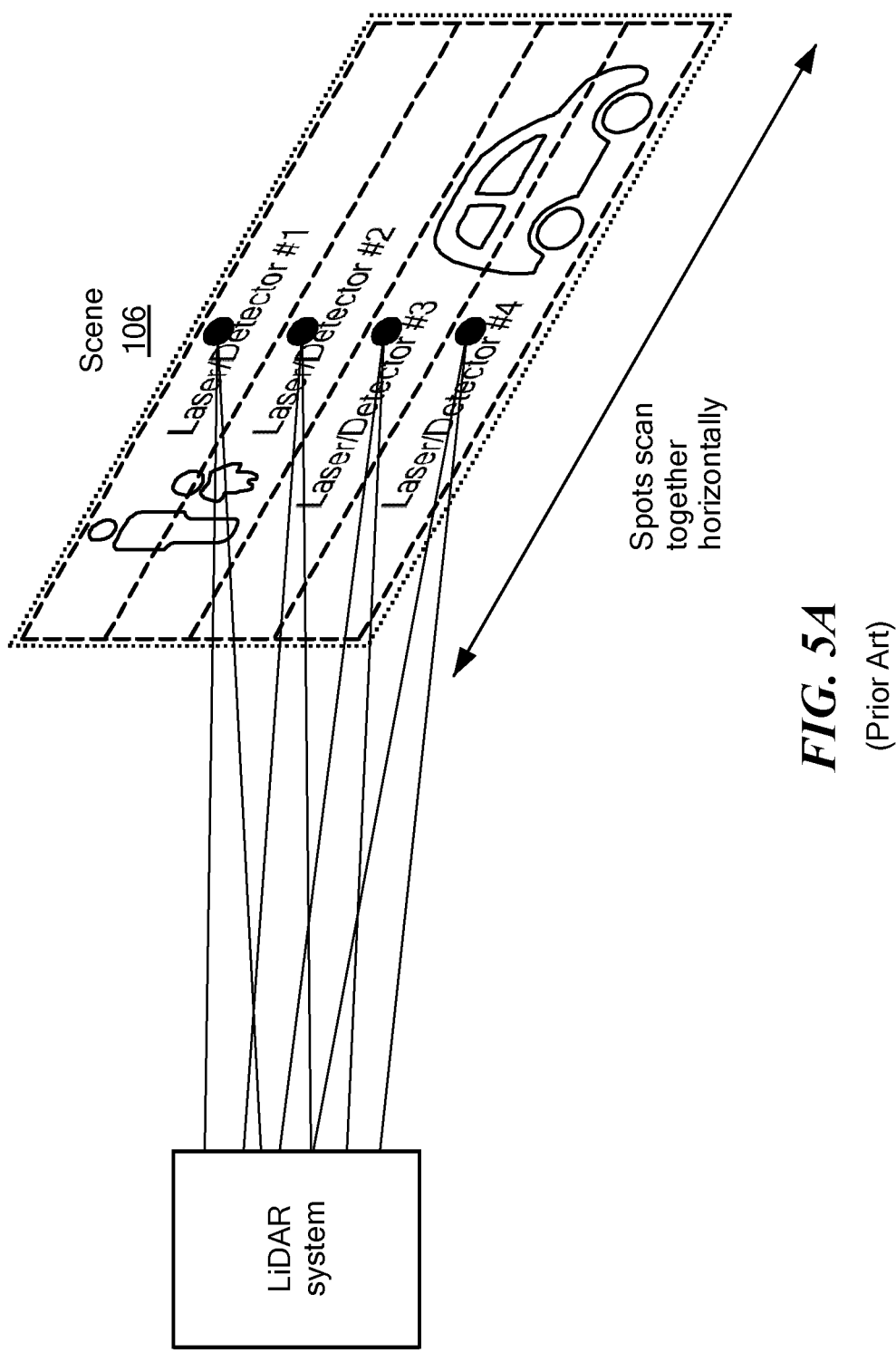
FIG. 5A illustrates a multi-laser LiDAR system that scans all its spots in unison, according to the prior art.
Figure 5B:
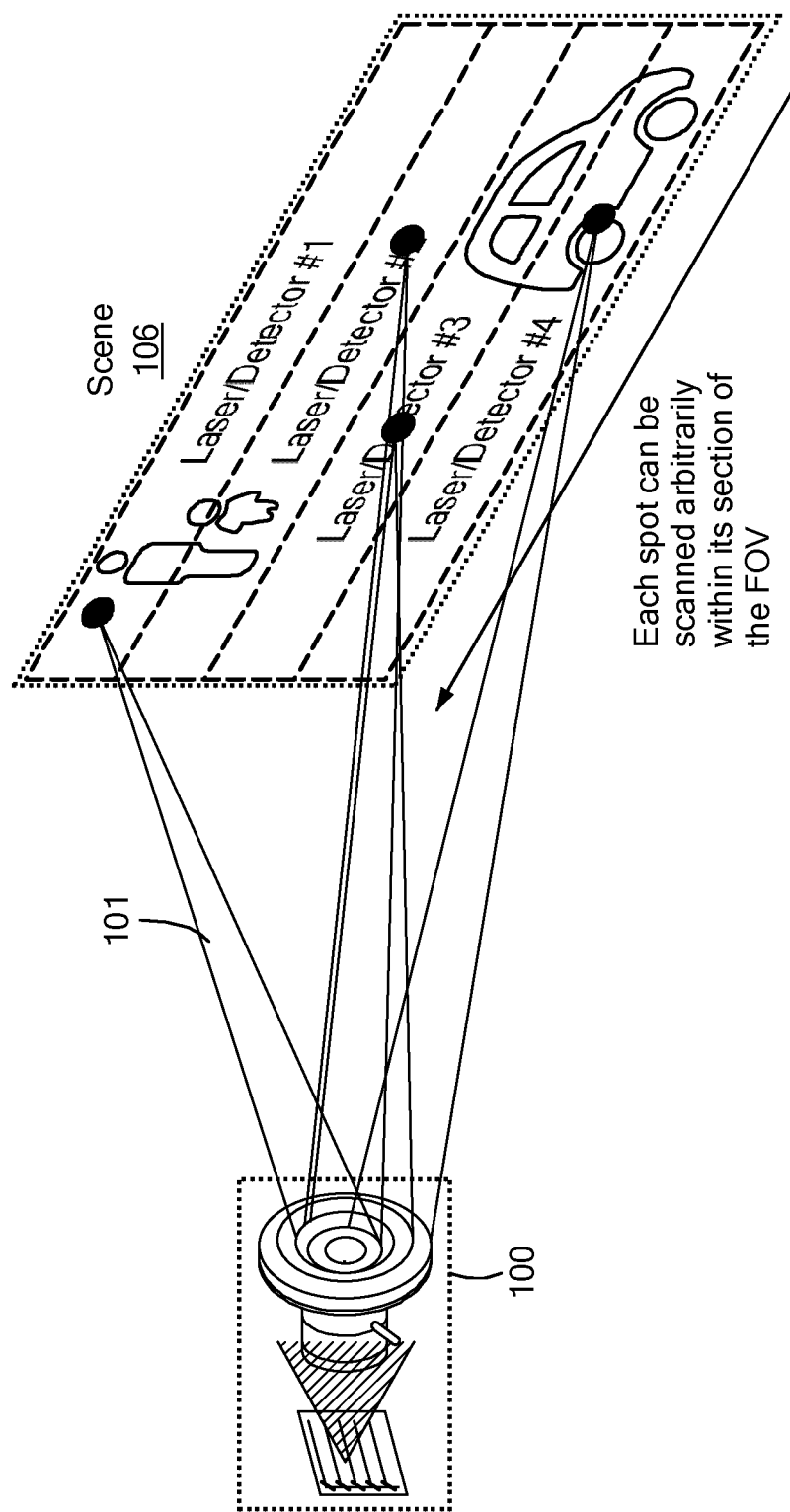
FIG. 5B illustrates a multi-laser LiDAR system that scans its spots independently, according to an embodiment of the present invention.

As discussed with respect to FIG. 1, only two MEMS switches are required to select an emission location from any of the gratings 124-126 on the PIC 110. This means that at any point in time, a beam 102 or 104 can be sent to any arbitrary position within the LiDAR system's field of view, allowing a degree of "random access" measurement of pixels, analogous to "random access memory" in computers. If the LiDAR system 100 has multiple detectors 116 or 308-314 and lasers 114 or 300-306 (FIG. 1 or 3) (or multiple laser/detector channels 214-220, FIG. 2), each detector and laser addresses one portion of the PIC and enables scanning of a portion 316-322 of the field of view (FIG. 3). Each laser/detector may be integrated with its own set of MEMS switches 120-126, which can be configured to independently scan arbitrary points within the respective section 316-322 of the field of view. This is in contrast to some other multi-beam LiDAR systems, a representative example of which is shown in FIG. 5A, which are configured with a column of lasers and detectors on a mechanically-actuated chassis, which sweep out the full field of view together, i.e., with synchronized movements. In these prior art examples, individual lasers cannot be selectively scanned across a different horizontal position from other beams. On the other hand, embodiments of the present invention, exemplified in FIG. 5B, scan each spot separately.

Adaptive Per-Pixel Dwell Time for Improved Frame Rate

The minimum frame rate of a LiDAR system is determined by situations where all or a large portion of the scene 106 is at, or past, the maximum operating range of the LiDAR system, and objects have low reflectivity. The laser power and dwell time per pixel (or spot in the scene) are determined such that a minimum ranging success rate (accurate measurement of the range to a given spot in the scene) is attained at maximum range and low reflectivity. For example, assume that autonomous driving requires at least SO ¾ ranging success per pixel measurement. Then from FIG. 4 we see that a 100 µs dwell time per spot is required, assuming 0.001 detected return photons per pulse for a maximum-range, minimum-reflectivity object.

Figure 6:
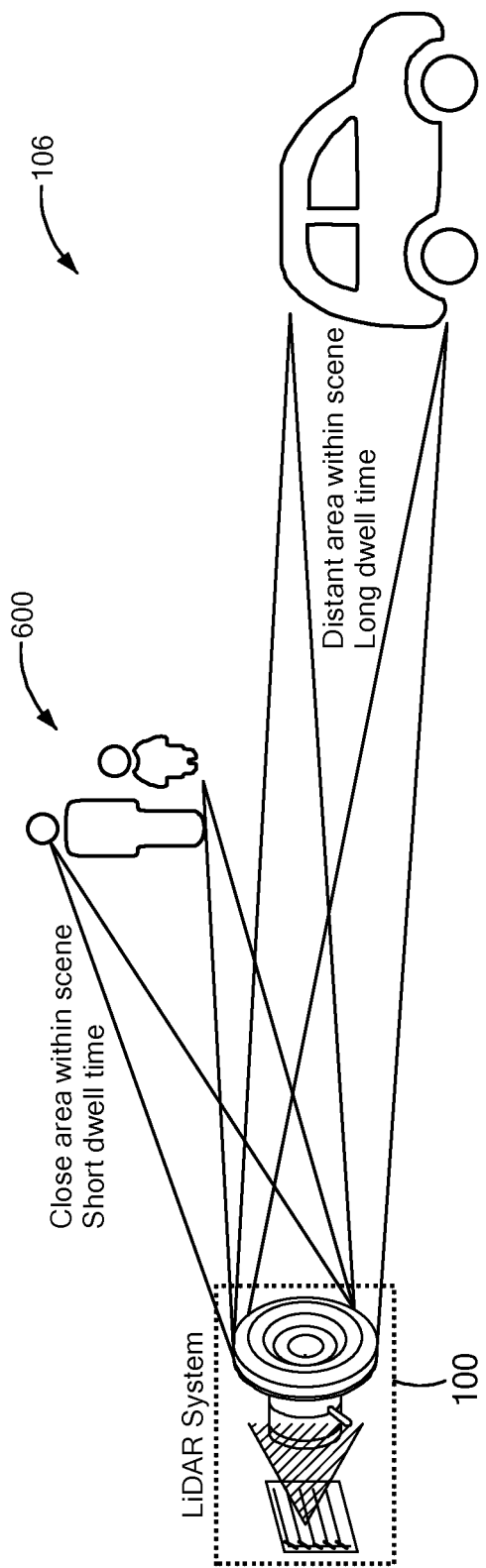
FIG. 6 illustrates a scene containing distant objects and closer objects scanned by a LiDAR system using different dwell times, according to an embodiment of the present invention.

However, because large portions, for example portion 600, of the scene 106 are closer than the maximum range, and some objects have higher reflectivity, a 100 µs dwell time is not required at all points within the scene, as illustrated in FIG. 6. The required dwell time for an accurate range measurement is inversely proportional to the number of return photons (FIG. 4). A 2× improvement in signal results in half the required dwell time. By using a short dwell time for close and high-reflectivity objects in the scene 106, the total frame rate of the LiDAR system 100 can be increased.

This adaptive per-pixel dwell time technique makes use of the unique MEMS scanning architecture described herein. As soon as an accurate range measurement is attained from a point in the scene 106, the laser/detector pair in question 114 and 116 or 214-220 or 300-314 (FIGS. 1-3) can shift to the next point in its scan pattern. Because each laser/detector can be scanned independently by the MEMS architecture, adaptive per-pixel dwell time does not require all lasers/detectors to step through their scan pattern in synchrony with one another.

Improved Safety Using Adaptive Scanning

Prior knowledge of a scene 106 can be used to optimize the scan patterns and improve safety afforded by a LiDAR system 100. Once a complete scan of the full field of view is done, knowledge of the objects within the scene 106 can be used to determine where a higher frame rate is necessary and where a lower frame rate and/or lower resolution would suffice. In general, a full raster scan is wasteful, because areas known, or highly likely, not to contain objects of interest, or that contain objects of low interest, for example because the objects are not humans or do not move, need not be fully scanned and/or need not be scanned as frequently. Thus, for example, since significant objects are not likely to enter the field of view from the sky, if the boundary of the sky can be identified, the interior of the sky boundary need not be scanned at all, or at least much less frequently than other portions of the field of view. This scheme provides more time to scan more relevant portions of the field of view, such as moving vehicles and/or pedestrians.

Figure 7:
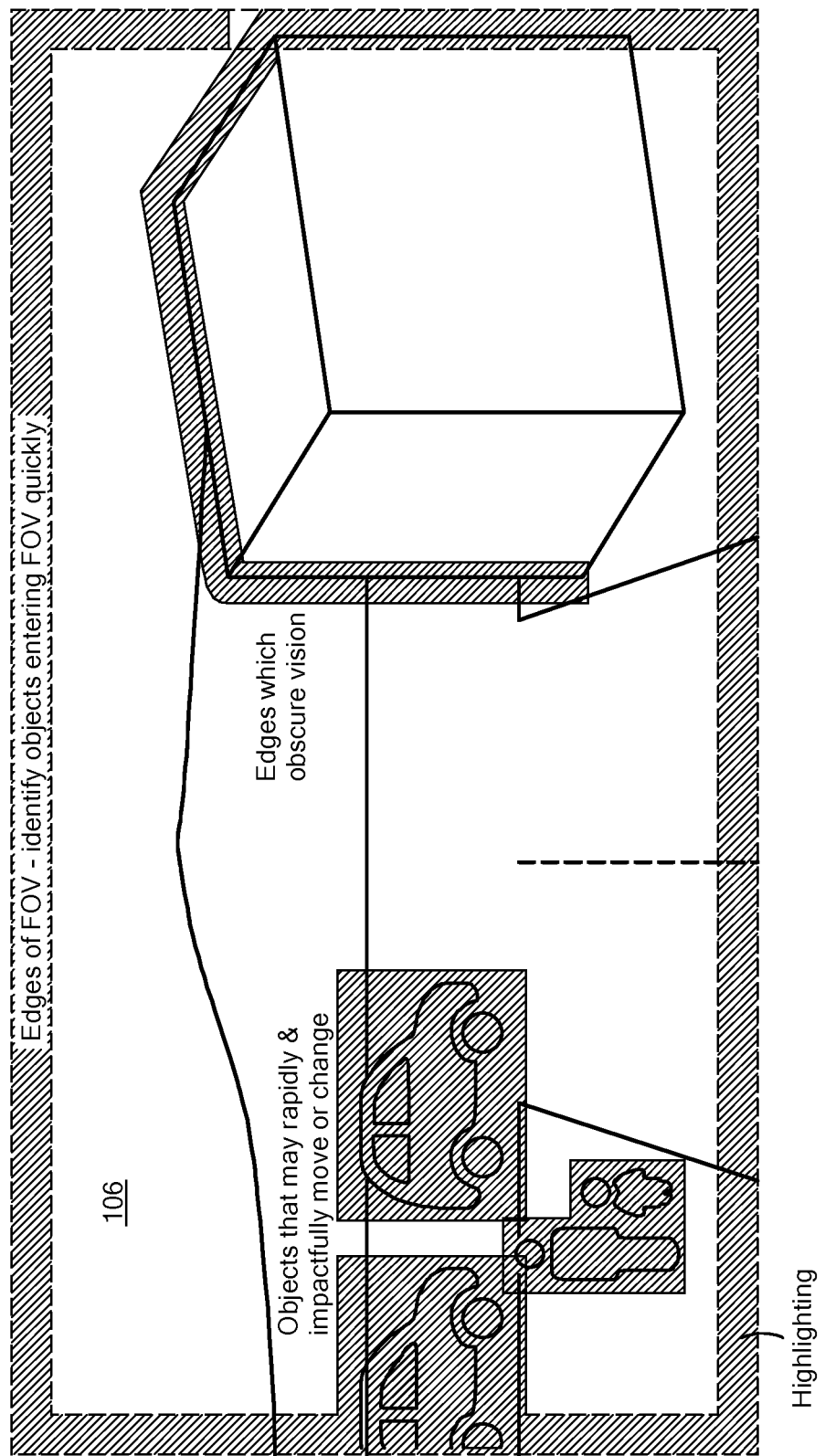
FIG. 7 highlights areas of a scene that should be scanned more frequently by a LiDAR system, according to an embodiment of the present invention.

In some situations it may be desirable to have faster refresh rates m specific locations within the scene 106. FIG. 7 highlights areas of a scene 106 that should be scanned more frequently. For example, on city streets with limited visibility around buildings, higher frame rates near corners of buildings would be beneficial to pick up new moving objects, e.g. people, cars, etc., entering the scene 106. The edges of the field of view can also be scanned more frequently to ensure new objects entering the LiDAR system's field of view are identified quickly. Additionally, higher refresh rates can be beneficial to keep track of objects that may rapidly and impactfully move or change, e.g. moving people, bicyclists, cars, car doors that may suddenly swing open, etc. These higher refresh rates can be achieved by using the selective scanning methods to monitor specific areas of interest within the field of view more frequently than the rest of the scene 106, as indicated by highlighted areas in FIG. 7.

"High frequency" objects include any objects that are moving or changing rapidly as a function of time in the scene 106, e.g., people, bicycles, cars. Edges of large objects, such as buildings, around which new objects can enter the scene 106 can also be scanned more frequently to ensure that new objects entering the scene are captured and identified quickly. Scanning the edges of the field of view more frequently also ensures that new objects entering the scene 106 in these areas are identified quickly.

Refreshing some regions within the scene 106 more frequently requires a trade-off of lower refresh rates and/or resolution in other regions within the scene 106. Regions which can be refreshed less frequently include objects that are stationary, e.g. buildings, trees, empty road surface, etc., and objects whose location and behavior is less important, e.g. cars on the opposite side of a highway divided by guardrails. By refreshing stationary and less-important objects less often, such as areas not highlighted in FIG. 7, more time can be spent refreshing portions of the scene 106 that contain objects of interest, as outlined in herein.

Lower scan resolution may be reasonable to use on some objects in the scene. Large objects (e.g. buildings, empty road surface, and large vehicle trailers, etc.) can be scanned at lower resolution if one contiguous object has been identified (areas not highlighted in FIG. 8). The edges of the object could still be scanned at the full resolution of the LiDAR system, with lower resolution used for the interior of the object in order to spend less time for each frame.

In many situations, the sky can represent a significant portion of the field of view. Because there will be no return signal from the sky, aside from scattered light off aerosols, fog, precipitation, etc., the maximum set dwell time will likely be necessary to ensure safety of the system, i.e., ensure the LiDAR system detects objects in the field of view. This represents a significant load on the LiDAR system, in terms of scan time. However, once the region of the field of view that encompasses the sky is identified, this knowledge can be used to lower the amount of time spent scanning the entirety of the sky. Objects are most likely to enter regions of sky across the edges of the LiDAR system's field of view or at interfaces between sky and foreground objects. Adaptive scanning can be used to selectively scan these areas at the full LiDAR system resolution and higher refresh rate. This will ensure that new objects in the scene 106 are identified quickly, so that the rest of the sky can be scanned at lower refresh rate and/or resolution.

Figure 8:
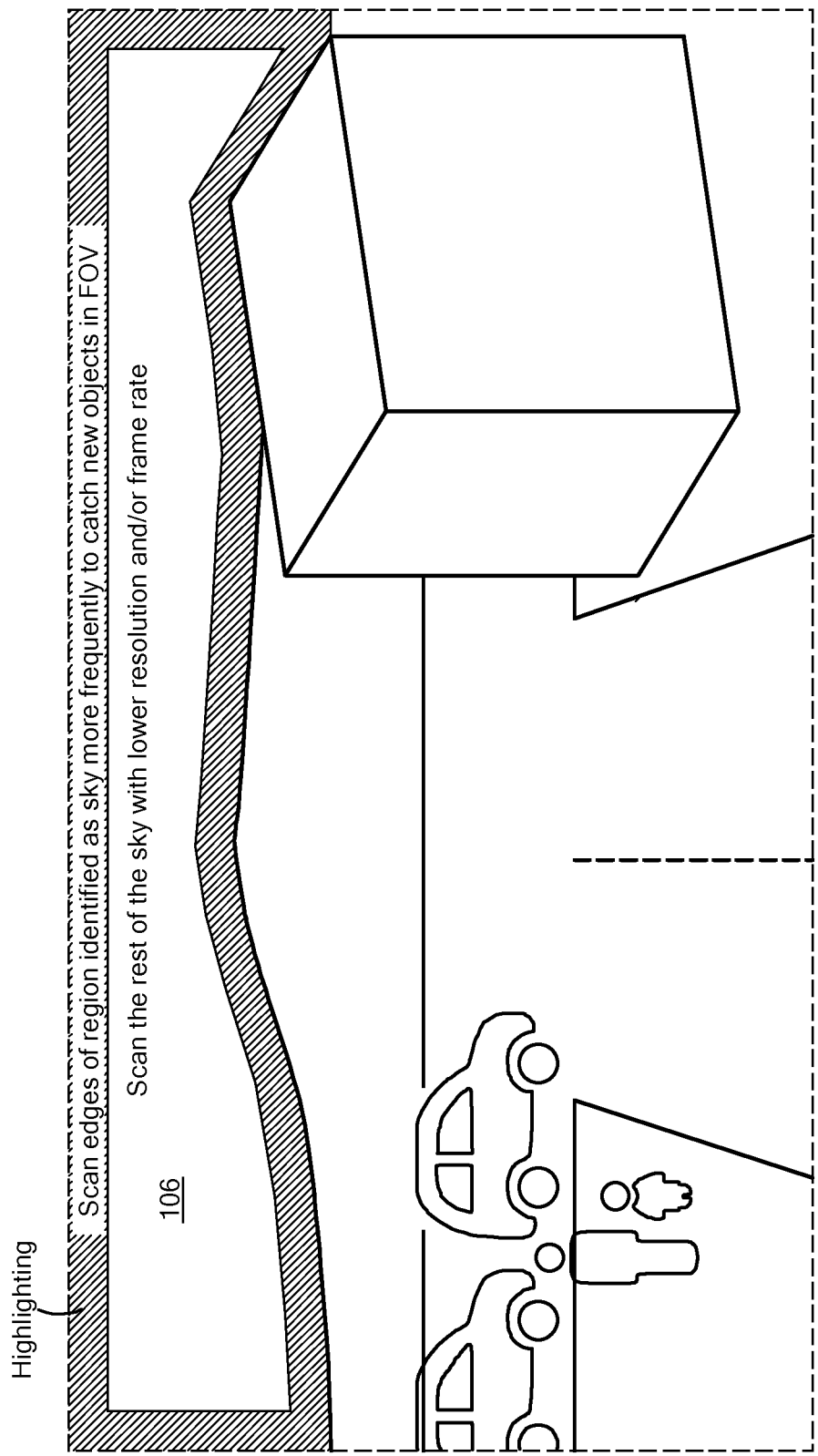
FIG. 8 illustrates how sky can be more efficiently scanned by a LiDAR system configured for adaptive scanning, according to an embodiment of the present invention.

FIG. 8 illustrates how the sky can be more efficiently scanned by a LiDAR system 100 configured for adaptive scanning. The edges of the region identified as sky can be scanned more frequently and at high resolution to identify new objects entering the scene 106. The rest of the sky can be scanned at lower resolution and frame rate to improve the overall frame rate of the entire scene 106.

For improved safety, the low-priority areas of the field of view should still be scanned at full resolution periodically, but they can be scanned at a lower rate than the high-priority areas.

MOEMS System Architecture Design to Facilitate Better Control of Scan Rates Across the Full Field of View Arrangement of the micro-opto-electro-mechanical systems (MOEMS) architecture described in FIG. 1 can be designed such that better control of beam scanning can be achieved in a multi-beam LiDAR system 100. As shown in FIG. 3, in one configuration of the waveguides and MEMS switches, each laser 300-306 and detector 308-314 addresses a contiguous set of horizontal waveguides (a plurality of horizontal waveguides), exemplified by waveguides 324 and 326, with grating couplers, exemplified by grating couplers 328 and 330, distributed along each of the horizontal waveguides 324-326. Each laser 300-306 and detector 308-314 addresses at least one row 324-326 of grating couplers 328-330. In this situation, the adaptive scanning techniques described herein are unlikely to be optimized across the full field of view. In many environments, areas within the lower portions of the field of view, such as horizontal band 322 and perhaps horizontal band 320, are more likely to be close to the LiDAR system 100, whereas areas toward the top of the field of view, such as horizontal bands 316-318, are more likely to be far away from the LiDAR system 100.

An optimized arrangement of the MOEMS architecture would ensure that each laser 300-306 and detector 308-314 in the LiDAR system 100 addresses a section of the field of view that includes some regions that are close to the LiDAR system 100 and some regions that are far from the LiDAR system 100. This can be achieved in a number of ways. For example, waveguides can be arranged vertically, or waveguides addressed by different detectors 308-314 and lasers 300-306 can be interleaved with one another. In some configurations, this can be accomplished with waveguides and MEMS grating switches in a serpentine configuration, for example as illustrated in FIG. 2. In other example configurations, the MEMS overpass waveguide switches can be utilized to ensure that the same laser and detector can address regions within the field of view that are separated from one another.

Figure 9A:
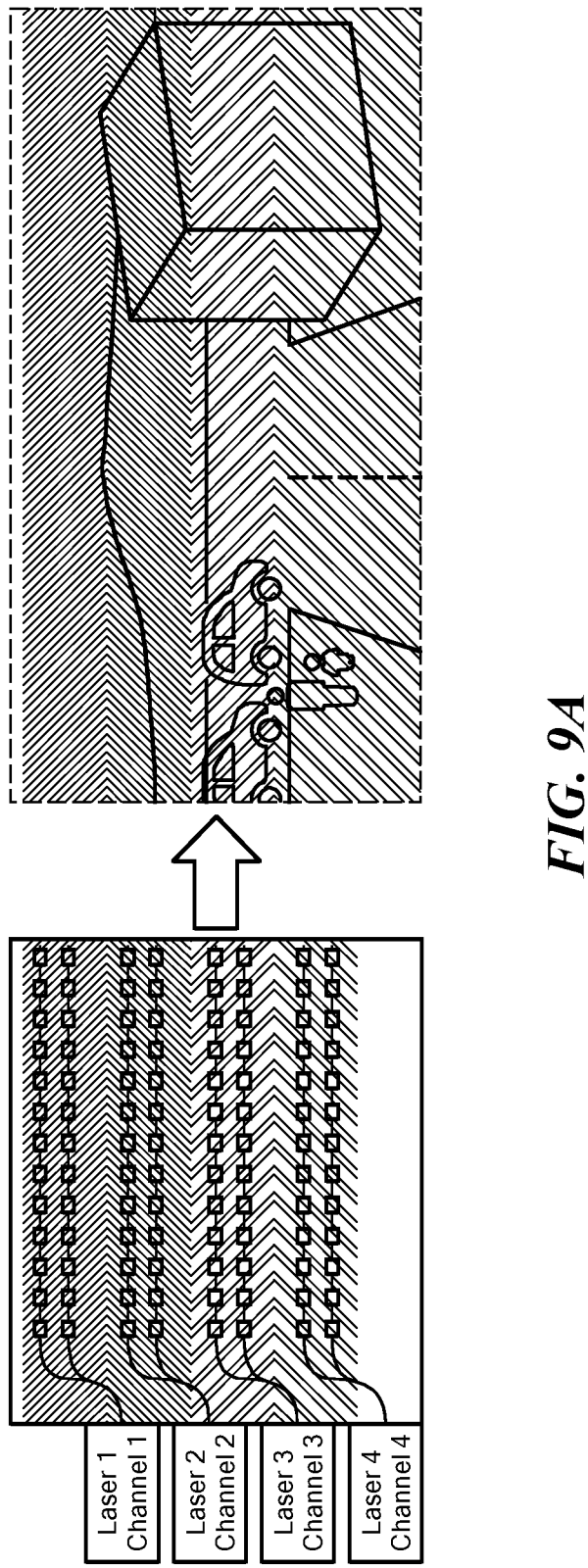
FIGS. 9A-9D illustrate several configurations of waveguides and MEMS switches for a LiDAR system, according to respective embodiments of the present invention.
Figure 9B:
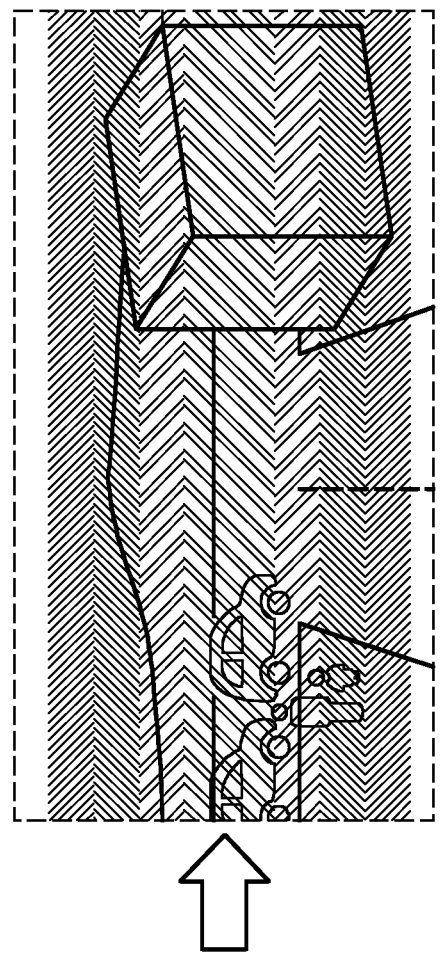
Figure 9B:
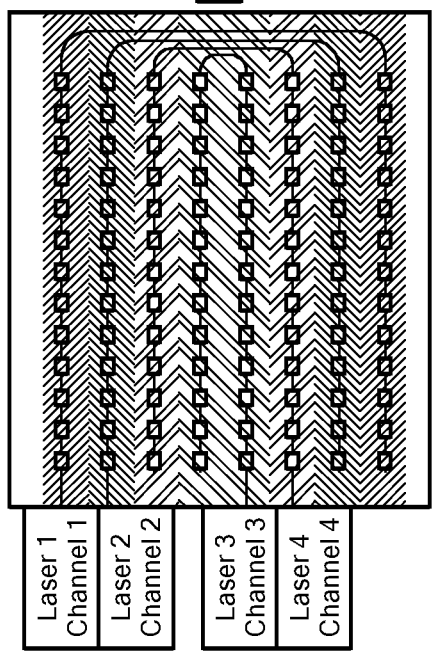
Figure 9C:
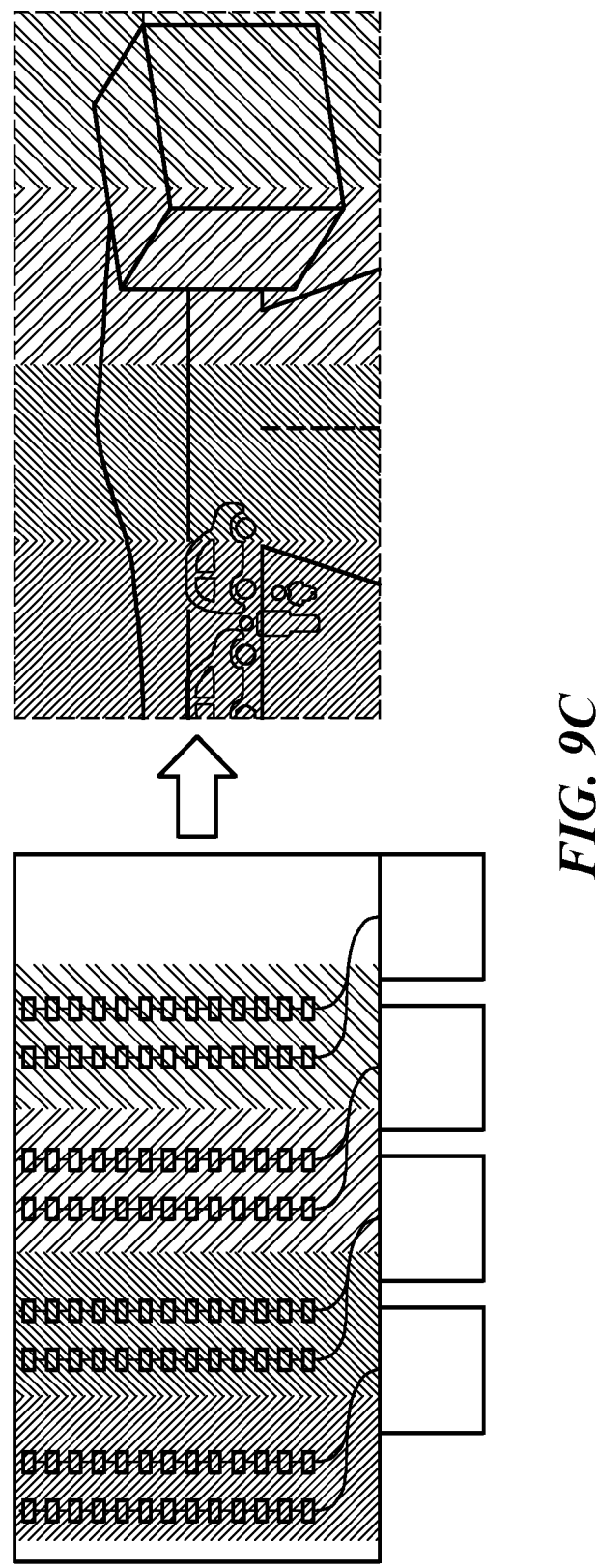
Figure 9D:
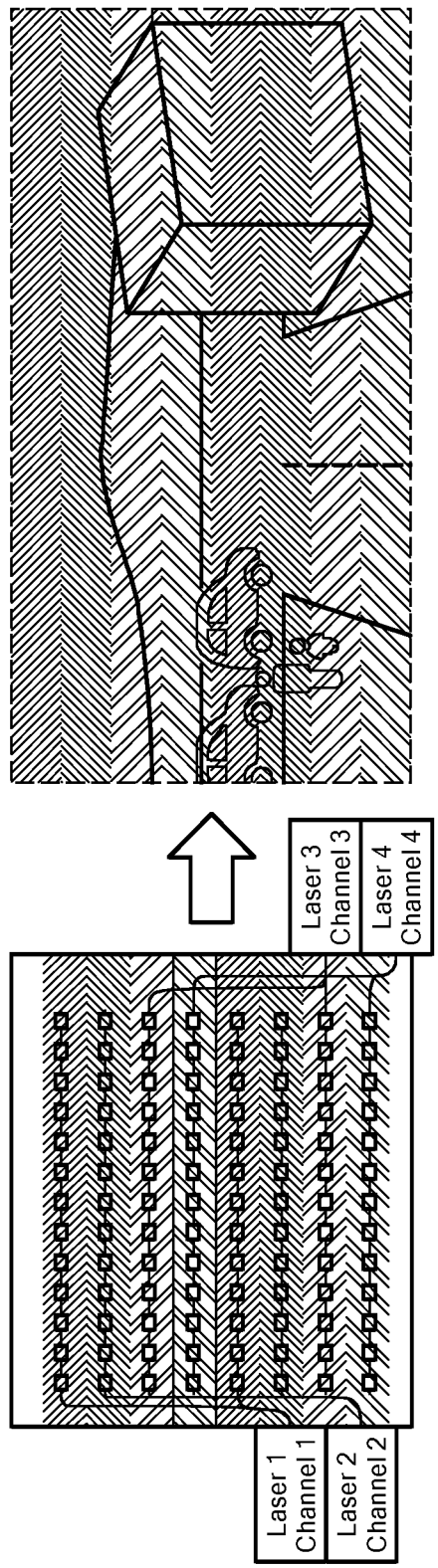

FIGS. 9A-9D illustrate several configurations of waveguides and MEMS switches. In each example, the colors (shadings/hatchings) represent how a specific region of the PIC corresponds to a particular portion of the field of view. In FIG. 9A, the top row likely mostly scans regions of sky in some scenes 106, resulting in low frame rates. In FIGS. 9B, 9C and 9D, different configurations lead to a more equal split between regions within the scene 106 that are close and far from the LiDAR system 100. Adaptive scanning may more effectively lead to an overall high frame rate scanning the entire scene 106 by balancing regions that require high versus low resolution and high versus low refresh rates. All examples, except for FIG. 9D, can readily be reconfigured to use serpentine waveguides with no MEMS overpass waveguide switches. Inclusion of overpass waveguide switches or serpentine waveguides in FIG. 9B can enable each laser and detector to address more than two rows of MEMS grating switches.

Figure 10A:
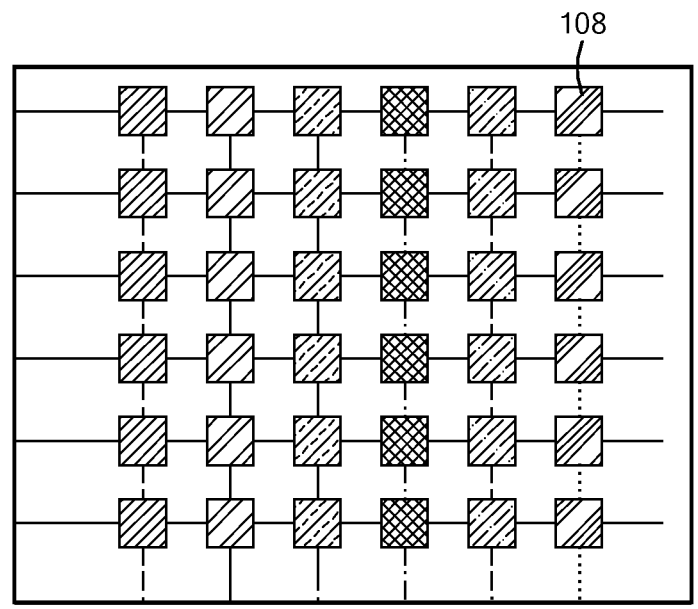
FIGS. 10A and 10B show methods for simple control of switches, while providing varying degrees of beam separation, according to respective embodiments of the present invention.
Figure 10B:
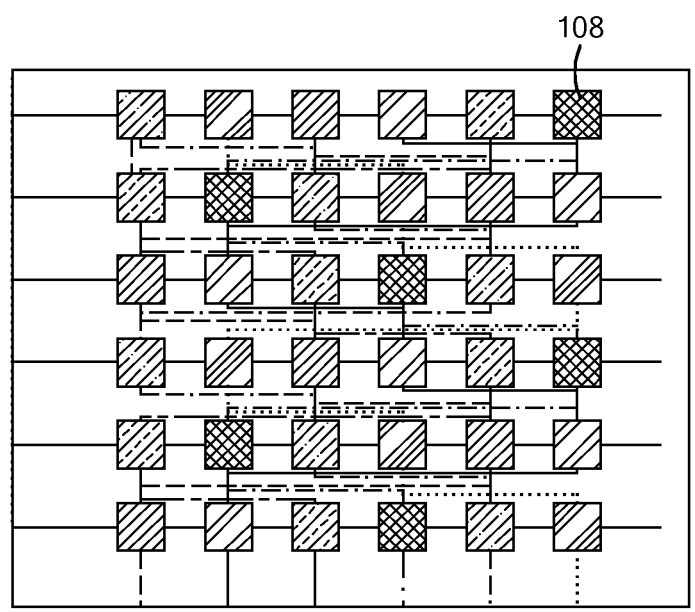

A suitable circuit to control the various configurations shown in FIGS. 2 and 9A-9D is described, with reference to FIGS. 10A and 10B. For many embodiments of the present invention, the beam is switched with random access. FIGS. 10A and 10B show methods for simple control of switches, while providing varying degrees of beam separation. In FIG. 10A, the simple method of connecting all vertical switches together provides poor separation of the beams. But in FIG. 10B, the switches are connected in a way that separates commonly controlled switches by greater spacings.

It is also possible to use a predetermined pattern to obtain better separation between the beam spots. FIGS. 10A and 10B show a comparison between a vertical pattern and more random one. In this example, each switch of the same color (shade/hatch) is controlled by a single wire, and all of the beams with the same color (shade/hatch) therefore switch simultaneously. The colors (shades/hatchings) in the left portion of the drawings correlate to portions of the scene 106 shown in the right portion of the drawings.

The pattern in FIG. 10A is a basic pattern where all the switches in a column are controlled simultaneously. As discussed previously, this provides poor separation between beams. The pattern in FIG. 10B has elements of the same color (shade/hatch) separated from one another in both the horizontal and vertical directions. This requires slightly more complex wiring, but provides a simple method of controlling multiple beams and obtaining greater separation than the vertical case. This is a simple example, and the principle can be expanded for larger arrays and more complicated patterns.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within +20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The LiDAR controller, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A LiDAR system having a field of view comprising a plurality of unique portions, the LiDAR system comprising:
   a laser;
   an array of optical emitters;
   an objective lens configured to optically couple each optical emitter of the array of optical emitters to a respective one of the plurality of unique portions of the field of view;
   an optical switching network coupled between the laser and the array of optical emitters;
   a controller coupled to the optical switching network and configured to cause the optical switching network to route light from the laser to a non-predetermined sequence of optical emitters of the array of optical emitters according to a temporal pattern and to dynamically vary the temporal pattern based at least in part on distance from the LiDAR system to an object within the field of view so as to vary dwell time per unique portion of the field of view, wherein the temporal pattern defines order and timing, according to which the light is routed to respective optical emitters of the array of optical emitters, to thereby define order and timing, according to which respective unique portions of the field of view are interrogated; and
   an optical receiver coupled to the optical switching network and configured to receive light reflected from the field of view.

2. A LiDAR system according to claim 1, wherein the controller is configured to dynamically vary the temporal pattern based at least in part on reflectivity of the object.

3. A LiDAR system according to claim 1, wherein the controller is configured to:
   during an unbroken series of interrogations, repeatedly interrogate one of the plurality of unique portions of the field of view that includes the object, without interrupting the unbroken series of interrogations and thereby interrogate another one of the plurality of unique portions of the field of view, and, for each interrogation of the unbroken series of interrogations, automatically estimate a respective distance to the object and automatically calculate a respective confidence score of the respective distance; and
   when the confidence score exceeds a predetermined value, terminate the unbroken series of interrogations and advance to interrogate another one of the plurality of unique portions of the field of view.

4. A LiDAR system according to claim 1, wherein the controller is configured to scan different unique portions of the field of view at different rates.

5. A LiDAR system according to claim 1, wherein the controller is configured to dynamically vary the temporal pattern differently for respective different non-overlapping regions of the field of view.

* * * * *